(12) United States Patent
Scaturro (10) Patent No.: US 11,498,294 B1
(45) Date of Patent: Nov. 15, 2022

(54) MATERIAL REPAIR KIT

(71) Applicant: Anthony Scaturro, San Clemente, CA (US)

(72) Inventor: Anthony Scaturro, San Clemente, CA (US)

( * ) Notice: Subject to any disclaimer, the term of this patent is extended or adjusted under 35 U.S.C. 154(b) by 155 days.

(21) Appl. No.: 15/225,834

(22) Filed: Aug. 2, 2016

Related U.S. Application Data (60) Provisional application No. 62/200,065, filed on Aug. 2, 2015.

(51) Int. Cl.
- *B29C 73/12* (2006.01)
- *B29C 65/14* (2006.01)

(52) U.S. Cl.
CPC .......... *B29C 73/12* (2013.01); *B29C 65/1406* (2013.01)

(58) Field of Classification Search
CPC ..... B29C 73/12; B29C 73/30; B29C 65/1406; B65B 29/10; B65D 81/3266
USPC ............................ 206/658, 221, 582; 53/443
See application file for complete search history.

(56) References Cited

U.S. PATENT DOCUMENTS

| | | | | |
|---|---|---|---|---|
| 3,660,194 A | * | 5/1972 | Hoffmann | B29C 53/382 156/191 |
| 5,714,208 A | * | 2/1998 | Ferrell | B29C 73/10 156/94 |
| 8,056,726 B2 | * | 11/2011 | Huff | B65B 29/10 206/568 |
| 9,289,952 B2 | * | 3/2016 | Zowalla | B29C 70/542 |
| 10,188,495 B2 | * | 1/2019 | Labrecque | A61F 2/0063 |
| 2018/0317666 A1 | * | 11/2018 | Clarke | A47C 31/00 |

* cited by examiner

*Primary Examiner* — Anthony D Stashick
*Assistant Examiner* — James M Van Buskirk (57) ABSTRACT

A kit for repairing material includes an external packaging defining an interior cavity and a repair packet inside the interior cavity. The repair packet includes a delivery layer, a frame positioned on the delivery layer, the frame being more rigid than the delivery layer and a repair material adhesively located on a first surface of the delivery substrate. A sacrificial layer is juxtaposed with the repair material such that the repair material is sandwiched between the delivery layer and the applicator layer.

8 Claims, 8 Drawing Sheets

MATERIAL REPAIR KIT

REFERENCE TO PRIORITY DOCUMENT

This application claims priority to co-pending U.S. Provisional Patent Application Ser. No. 62/200,065 entitled "Material Repair Kit" and filed on Aug. 2, 2015. The disclosure of the provisional patent application is incorporated herein by reference in its entirety and priority to the aforementioned filing date is hereby claimed.

BACKGROUND

It can often be a tedious, time-consuming and a messy process to repair damage and/or broken surfaces, structures, equipment, toys, or otherwise, which may be made out of materials such as fiberglass, plastics, wood etc. The preparation and execution of such repairs and restoration require know-how and a specific skill set and expertise. The repair of such materials requires a variety of different items, such as sandpaper, fiberglass, bonding agents such as polyester, epoxy, polyurethane resin to name a few, mixing cups and materials, masking tape, acetone and other cleaning solvents, and various other materials, items, equipment, that are typically require these items to be purchased individually or may be in part or in whole contained within a repair like kit, however, they generally remain as numerous individual parts, pieces or materials. The repair person must then prepare, execute and apply the repair materials in a correct way ensuring that they are all properly combined in an effective way. They must be careful to ensure that multi-part resins are mixed in the correct ratio or if the resin is a one-part with an alternative mechanism to catalyze the resin, that the correct amount is of resin or bonding agent and that the correct saturation of the bonding agent penetrates or impregnates the materials sufficiently in order to achieve an affect seal, structural integrity, aesthetic finish, desired result.

In view of the foregoing there is a need for systems and methods for quickly and/or sufficiently repairing damage to materials and structures without the complicated and messy preparation and/or clean up while achieving a professional quality repair. This will particularly appeal and benefit people who generally have less expertise, or that desire a simpler repair process and/or require less materials and supplies to be purchased. Furthermore, such systems and methods will make it easier to prepare the surfaces/structures and material, a simplified process to execute the proper repair while yielding less mess and material wastage than with traditional methods of repair. There can be additional applications for industrial, professional and personal use for those who also desire the same benefits that these systems and methods offer to the less experienced person.

SUMMARY

Disclosed is a self-contained kit that can be used to easily and quickly repair damage to any of a wide variety of materials including but not limited to fiberglass and plastic. The disclosed kit substantially mitigates and/or eliminates the need to purchase and assemble the numerous materials and tools that would otherwise be required to repair a damaged area of material. The disclosed kit can be used to repair various types of damage, such as cracks, scrapes, delaminated punctures, compound fractures or breaks, holes, and other types of damage on the material.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The details of one or more variations of the subject matter described herein are set forth in the accompanying drawings and the description below. Other features and advantages of the subject matter described herein will be apparent from the description and drawings, and from the claims.

DETAILED DESCRIPTION

Before the present subject matter is further described, it is to be understood that this subject matter described herein is not limited to particular embodiments described, as such may of course vary. It is also to be understood that the terminology used herein is for the purpose of describing particular embodiments only, and is not intended to be limiting. Unless defined otherwise, all technical terms used herein have the same meaning as commonly understood by one skilled in the art to which this subject matter belongs.

Disclosed is a self-contained kit that can be used to easily and quickly repair damage to any of a wide variety of materials including but not limited to fiberglass and plastic. The disclosed kit substantially mitigates and/or eliminates the need to purchase and assemble the numerous materials and tools that would otherwise be required to repair a damaged area of material. The disclosed kit can be used to repair various types of damage, such as cracks, scrapes, delaminated punctures, compound fractures or breaks, holes, and other types of damage on the material.

Various types of materials may be contained within a kit and used to repair damage to an object or item. Repair materials contained within the repair kit may be, but not limited to, fiberglass, carbon fiber, Kevlar aramid fiber, Innegra, a woven, co-woven, co-mingled, fibrous or non-fibrous material such a plastic, polyurethane, polyethylene, polypropylene, polymer, co-polymer, resin, cured or semi cured resin, gel-coat and more. A bonding agent is generally but not necessarily included in the kit and may pre-impregnate into the repair material or subsequently injected or vacuum infused at a later point into the repair materials. The bonding agent may be single part or multi part resins which may be catalyzed by UV light or other light curing devices, thermoset resins which may cure endothermically or exothermically or in any combination thereof or from any other source of heat, oxygen, light, water, chemical or otherwise a catalyst. The repair kit can be used to repair objects such as but not limited to surfboards, boats, bathtubs, automobiles, aerospace vehicles and devices, wind turbines, and any other compatible with any repair materials, bonding agents that may be configured in a variety of combinations within the confines of the repair kit and repair packet assembly.

The disclosed repair kit can replace previous kits that require substantial knowledge, preparation work, specialized tools, templates, jigs, equipment, machinery for the user to assemble and properly apply various amounts of repair material and bonding agent or agents to the damage.

Figure 1:
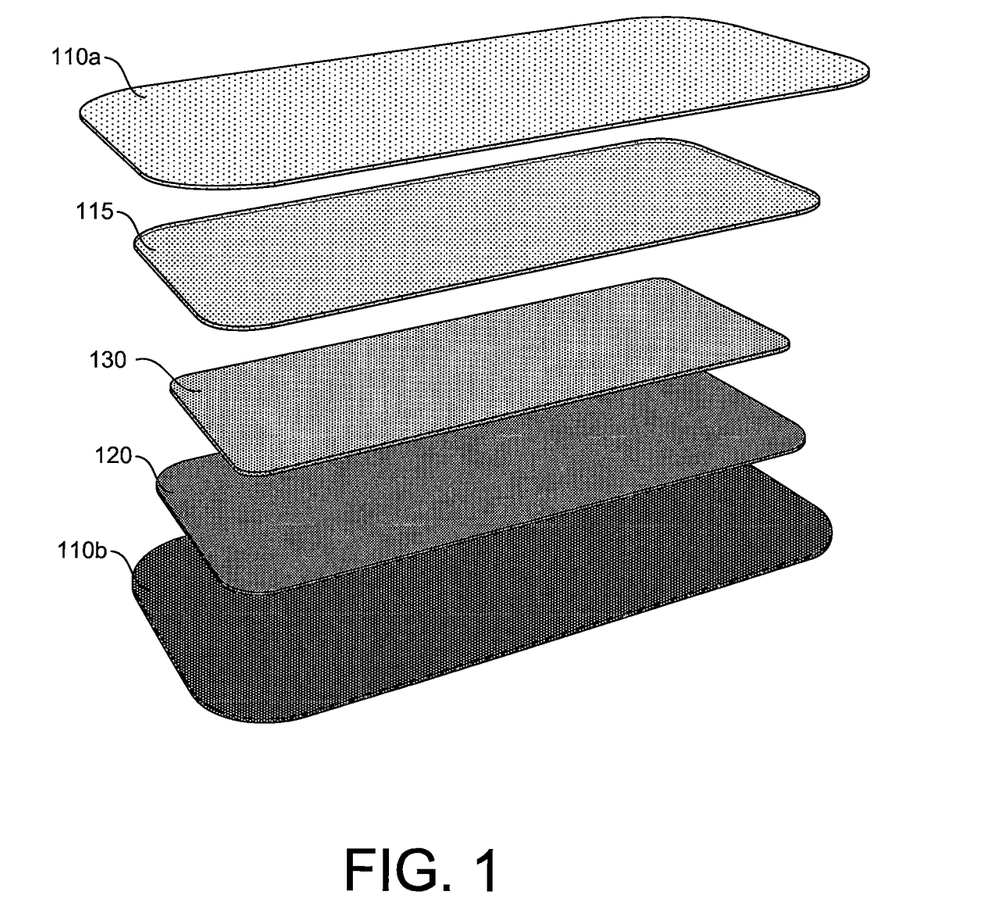
FIG. 1 shows an example embodiment of a material repair kit.

FIG. 1 shows an example embodiment of a material repair kit 105, which includes a variety of components for repairing damage to a material of an object, structure or surface thereof. In the example embodiment, the material repair kit 105 includes an external packaging 110 with a top portion 110a and bottom portion 110b. The external packaging 110 defines an internal cavity between the top and bottom portions that contains the components of the repair packet. For example, the following components can be contained in the internal cavity of the external packaging 110:

1) a delivery layer (also referred to as the applicator substrate) 115; The delivery layer can be made of a non-stretch material or alternatively a material that allows the delivery layer to stretch in any and all directions simultaneously such that the delivery layer can stretch in a manner that it allows the delivery layer to wrap and/or fill a compound curved surface, crack, hole and/or protrusion. Non-stretch and/or stretch materials can be any material that is compatible with the repair material such that the delivery layer is not damaged by the repair material. The non-stretch material should also be impermeable by water and/or air. Additionally, the bonding agent and its inherent chemical composition does not in any way alter, degraded or destroyed the delivery layer. Stretch materials can be made of flexible plastics, polymers, co-polymers, cured or semi cured resin, fiberglass, silicone or any derivative therefrom and/or any combination thereof. Such material is impermeable by water and/or air and is not damaged by the repair material nor does the bonding agent and its inherent chemical composition alter, degraded or destroyed the delivery layer in any way.

2) a sacrificial layer 120; The sacrificial layer can be made of a non-stretch or stretch material. Non-stretch and/or stretch materials can be any material that is compatible with the repair material such that the sacrificial layer is not damaged by the repair material. The bonding agent and its inherent chemical composition do not alter, degraded or destroyed the sacrificial layer. Both the delivery layer and sacrificial layer are also compatible with each other and any adhesive applied to either the delivery layer and/or sacrificial layer should also be mutually compatible. The sacrificial layer can be made of paper or coated paper, plastics, polymers or co-polymers, cured or semi cured resin, silicone or any derivative therefrom and/or any combination thereof.

3) a repair material 130, such as for example, fiberglass, fiberglass or any derivative thereof with a pre-cured bonding agent and or resin, carbon fiber, KEVLAR aramid fiber, woven or non-woven material, or adhesive or resin alone, which may or may not be impregnated with a bonding agent 125.

The delivery layer, sacrificial layer, repair material, and bonding agent (when present) collectively form a repair packet of the repair kit. As discussed below, the repair material is mounted on the delivery layer, which is used to deliver the repair material and/or bonding agent to the object to be repaired. The sacrificial layer is coupled to the delivery layer but not necessarily the repair material and is removed therefrom during use.

The aforementioned components are combined to form the repair kit 105. In an optional embodiment, the repair kit 105 can also include an option to create a local vacuum and/or injection site or ports. Examples of each of the components are now described in detail.

Figure 2:
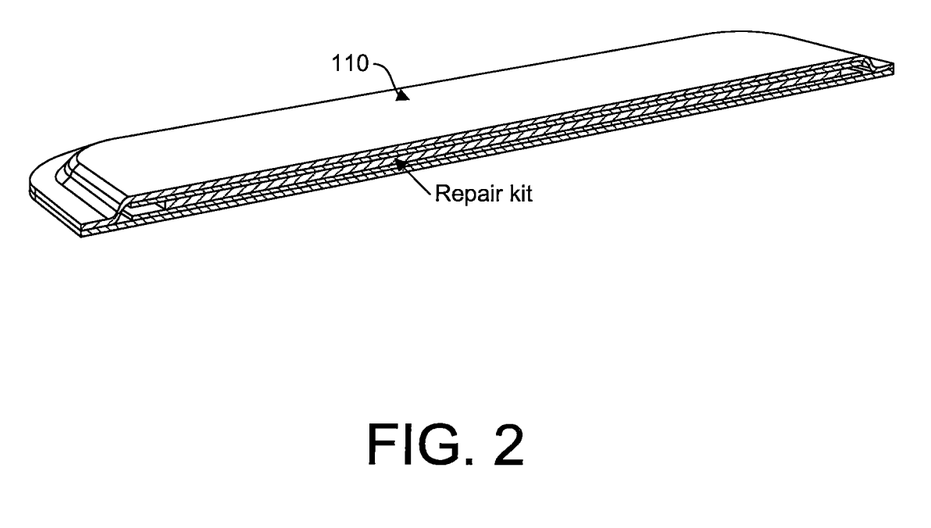
FIG. 2 shows a cross-sectional view of the repair kit, showing the internal cavity that contains a repair packet.

The external packaging contains the components that form the repair packet. The packaging includes a top portion 110a and a bottom portion 110b that collectively define an internal cavity. In an embodiment, the external packaging is impermeable to light or any compatible catalyst to mitigate any catalyzing effects of the bonding agent contained in the external packaging and more specifically the repair packet, such as where the resin is UV or light curing or a Thermoset resin could be prematurely cured if any such exposure to its respective catalyst was to infiltrate or be inadvertently introduced prematurely. FIG. 2 shows a cross-sectional view of the repair kit, showing the internal cavity that contains a repair packet.

The external packing may also contain a repair packet that can deliver a partial set of components, repair material and bonding agent while preserving and protecting the unused materials from light exposure or other catalyzing effects. In an embodiment, the external packaging is a canister, such as a light impermeable, cylindrical canister. The material, substrate, and applicator can be contained within the canister.

Alternatively, the external packaging may be instrumental in separating and/or containing the bonding agent when a repair kit or repair packet uses a Thermoset resin such that the part-A resin and part-B hardener or catalyst can remain separated until it is desired to mix them together to catalyze the resin (bonding agents) inside the internal packaging and more specifically the repair packet so that the repair packet can deliver the repair materials with bonding agent by way of the delivery layer to the repair area prior to the bonding agent catalyzing and curing on the subjects surface.

The delivery layer 115 is the primary means that is used deliver the repair material 130 and/or the bonding agent 125 to the subject's surface in order to affect a repair or cosmetic effect. The delivery layer 115 can be made of any of a variety of materials, which may be transparent or translucent in order to allow light to pass through the substrate and if a UV or light curing catalyst is not required then the delivery substrate can be opaque in nature. The ability for light to pass through the delivery layer 115 allows the UV or other light curing instruments to catalyze and affect curing of the bonding agent 125.

The delivery layer 115 can be non-stretch, planar material or may be able to stretch in multiple directions and have elasticity as well as flexibility. Both non-stretch and elasticity of the delivery layer 115 provides skin tension which, when applied to a surface will help to mitigate any air bubbles and osmosis, seepage or leakage from within or externally from the parameter of the delivery layer 115. The skin tension and seal created by the adhesive on delivery layer 115 creates positive pressure on the repair material and the bonding agent helping to improve the mechanical and/or chemical bonds between the repair material and the bonding agent on the surface of the subject or object that is being repaired. The surface tension of the delivery layer 115 assists in faring and or feathering of the bonding agent and repair material into and/or onto the subject's surface. When using a delivery layer 115 that can stretch in two or more directions, the stretch allows the delivery layer 115 to wrap on, over, around compound curves and complex surfaces in which the repair material and the bonding agent naturally conform accordingly before curing.

The delivery layer 115 may also have an adhesive on one side of it in order to hold in place any repair material during the manufacturing of the repair kit and during the delivery of the repair material to the surface of an object during the repair process. Having an adhesive on the delivery layer 115 creates an air tight seal around the bonding agent and repair material thereby mitigating or eliminating the unwanted consequences of osmosis, seepage or leakage, movement of unwanted flow of the resin and/or bonding agent, from within the delivery layer or from external of the parameter of the of the delivery layer 115 whether the delivery layer is on a horizontal or vertical orientation.

The delivery layer (also known as the applicator substrate) may include a frame on the delivery layer substrate wherein the frame surrounds at least a portion of the repair material. The frame may be a rigid or semi rigid, planar structure to maintain the applicator substrate's shape and form, such as when using and very thin, pliable substrate material that could otherwise be difficult to handle or maintain its shape and form without a frame on the substrate. The frame may be kept on or peeled away as desired after the applicator substrate and repair material and/or bonding agent are applied to the subject. The frame may be a material that is stiffer or more rigid than a substrate material of the delivery layer.

Once the repair material and/or bonding agent is delivered or applied to the area of damage and the bonding agent cures, the delivery layer 115 can be removed and discarded leaving the desired repair material with bonding agent in place and the effects are a repair to a previously damaged surface or surface that required repair, augmentation or visual manipulation now being at least stronger, structurally sound, water tight and with an enhanced visual aesthetics.

Figure 3:
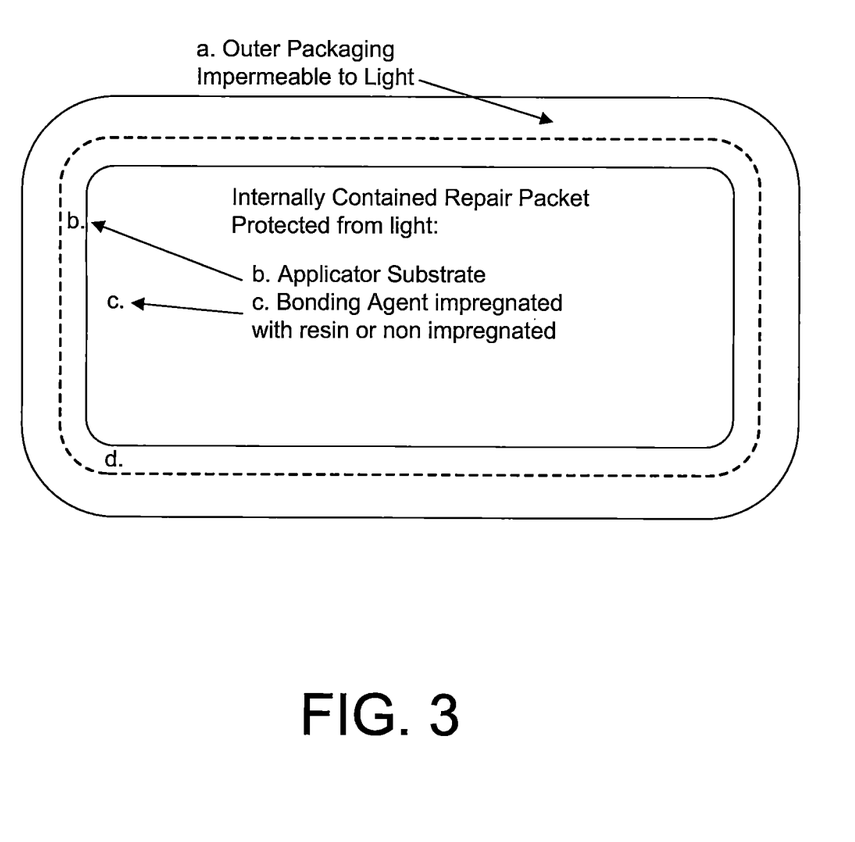
FIG. 3 shows a top, cross-sectional view of the repair kit.

FIG. 3 shows a top, cross-sectional view of the repair kit. FIG. 3 shows the outer packaging 110, which is impermeable to light or other catalysts and which surround a repair packet. As mentioned, the repair packet includes the delivery layer a.k.a. applicator substrate and sacrificial layer, as well as the repair material, which may or may not be impregnated with the bonding agent. The dotted line represents a seal between the applicator substrate and the repair material.

The sacrificial layer 120 is located on the opposing side of the delivery layer. Between the delivery layer and the sacrificial layer 120 are contained the repair material and/or bonding agent. There is an adhesive or otherwise seal around the perimeter and if applicable between both the delivery layer and the sacrificial layer.

The bonding agent is contained within the repair packet and may be a variety of single part or multi part resins and/or bonding agents. The bonding agent may be catalyzed by UV light or other light curing devices, thermoset resins which may cure endothermically or exothermically or in any combination thereof or from any other source of heat, oxygen, light, water, chemical or otherwise a catalyst.

The repair materials may be a material such as fiberglass, carbon fiber, Kevlar, Innegra, a woven, co-woven, co-mingled, fibrous or non-fibrous material such a plastic, polyurethane, polyethylene, polypropylene, polymer, co-polymer, resin, cured or semi cured resin, gel-coat or otherwise, which can be delivered to a surface in order to affect a structural, aesthetic repair or cosmetic.

As mentioned, a local vacuum can optionally also be included as part of the repair kit. It may be desirable to create a localized vacuum between the delivery layer and the object being repaired. The adhesive perimeter on or around the delivery layer creates an airtight and/or water tight seal between delivery later and the object being repaired thereby creating an opportunity to apply a localize vacuum in the area that will be repaired. The delivery layer may include a built in interface to engage a local vacuum in a variety of ways including, for example, by drawing back on a syringe wherein the air trapped between the delivery layer can be extracted from the space between the object surface that the repair is being applied. This promotes better bonding between the objects being repaired and the repair material and bonding agent. It will also be possible to infuse the void in under the delivery layer and/or the repair material using this technique/process to vacuum infuse this space and/or the accompanying repair materials with a bonding agent. When using the vacuum infusion process a bleeder cloth or bleeder material may also accompany the repair material to allow for proper airflow, which will promote better and a more consistent flow of the bonding agent within the delivery layer and around the repair material. The repair material to allow for proper airflow which will promote better and a more consistent vacuum within the delivery layer and around the repair material.

An injecting device can be used to inject a resin and/ bonding agent into the space between the delivery layer and the objects surface that the repair is being applied to the delivery layer. The adhesive parameter on the delivery layer creates an airtight seal between it and the object being repaired which mitigates or eliminates any leakage or seepage during injection and/or vacuum and the curing phase. The delivery layer may include a built in interface/nozzle providing for either an injection port or vacuum port. This can be done in a variety of manners, such as by using a syringe or other alternative vacuum or injection devices whether manually or by machine or as may otherwise be applicable. When using the injection and/or infusion process a bleeder cloth or bleeder material may also accompany the repair material to allow for proper air flow which will promote better and a more consistent injection flow of the bonding agent within the delivery layer and around the repair material.

Figure 4:
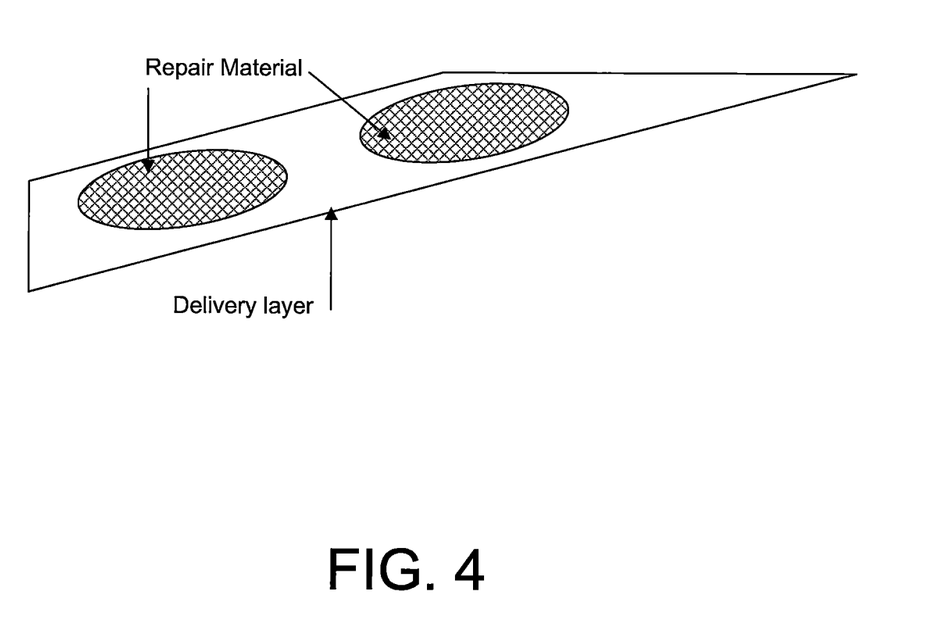
FIGS. 4-7 illustrate a method of manufacturing the repair kit.

Some example methods of manufacturing the repair kit are now described. An automated process of manufacturing yields a higher output, consistent quality and lower cost. A non-limiting example of manufacturing the repair kit includes a flexible pouch-filling and/or packet-filling machines to automate the pre-preg or resin infusion of the bonding agent into the repair packet. The delivery layer (in the form of an elongated strip of substrate material in a non-limiting example) has an adhesive on one side. As the strip of the delivery layer passes through an assembly line, repair materials, precut to a desired shape and size, are placed on the adhesive side of the applicator substrate without any bonding agent, as shown in FIG. 4. The adhesive holds the repair material in place as well as maintains the shape and fiber orientation, if applicable, of the repair material.

Figure 5:
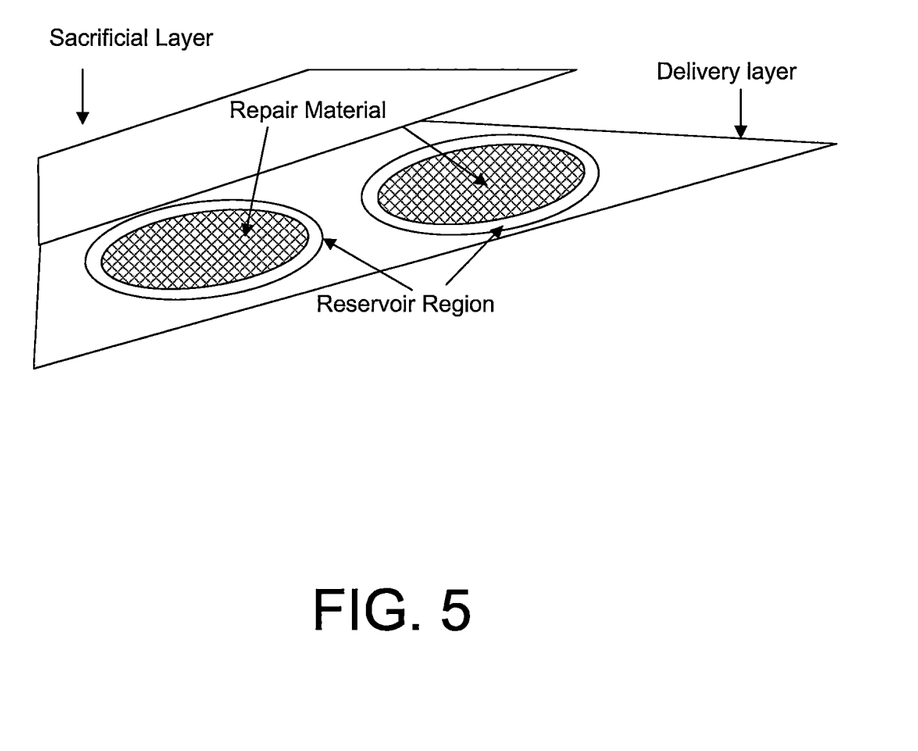

With reference now to FIG. 5, the sacrificial layer is introduced into the assembly line and will be adjoined with the delivery layer thereby sandwiching the repair material between the delivery layer and sacrificial layer. The two layers (delivery layer and sacrificial layer) are adhered together with enough bonding strength to hold them together when introducing the bonding agent and while in its packaging prior to use. However, they should be able to be peeled apart in order to separate the sacrificial layer from the delivery layer while leaving the repair material securely fashioned to the face of the delivery layer, which is held in place by an adhesive or alternative methods to accomplish the same effect. Both layers are adhered to one another in a non-permanent manner. However, between the area of the applicator substrate, repair material and the sacrificial layer there is a reservoir region with a border around the perimeter of the repair material to capture and contain the bonding agent once it is introduced within the repair packet.

Figure 6:
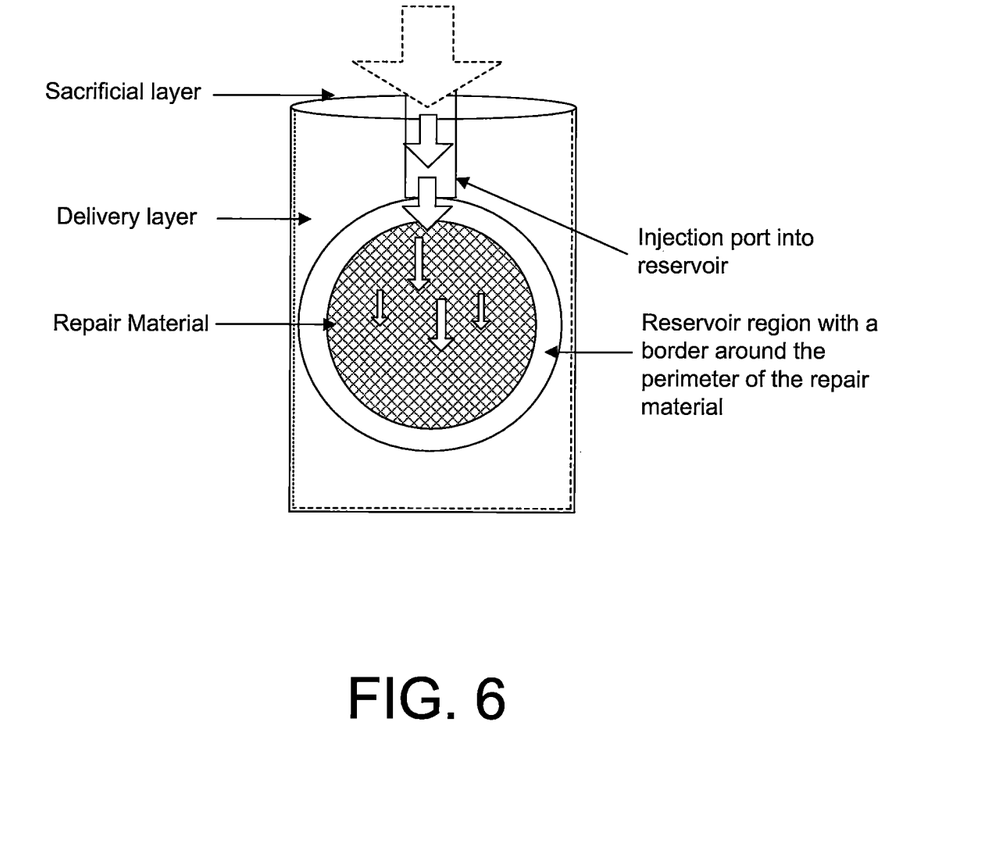

With reference now to FIG. 6, the delivery layer and sacrificial layers are then bonded eventually on three (3) sides or more (as represented by dashed lines in FIG. 6) or sufficiently around the boarder of any shape with more than three (3) sides or a shape with no definitive sides such as a circle. The bond around the sides of any such shape should continue from such sides, inwardly, up and to but not within the reservoir where the repair material and/or bonding agent will be contained as defined by FIG. 6. Such bond will provide for an open access point or access port on that leads to a reservoir or internal cavity where the repair material is contained. The access point provides a port to inject or infuse (as represented by downward facing arrows in FIG. 6) a bonding agent into the reservoir between the delivery layer and sacrificial layer and specifically in a defined perimeter around the repair material in the reservoir that will contain the bonding agent within the repair packet by way of the bond between the delivery layer and sacrificial layer until the repair packet is ready to be used. As mentioned, the hash or dashed lines in FIG. 6 and the surface of the delivery layer with up and to the reservoir should collectively be considered the bonding area. This bonding area on the delivery layer will create a seal around the perimeter of the reservoir where the repair material and/or bonding agent reside. While there is adhesive on the delivery layer within the reservoir under the repair material such that it holds the repair material in place in its entirety, there is no adhesive or bond on the delivery layer around the repair material but within the perimeter of the reservoir so that the void within the reservoir can be kept open between the delivery layer and sacrificial layer that will contain the repair material and/or bonding agent.

Figure 7:
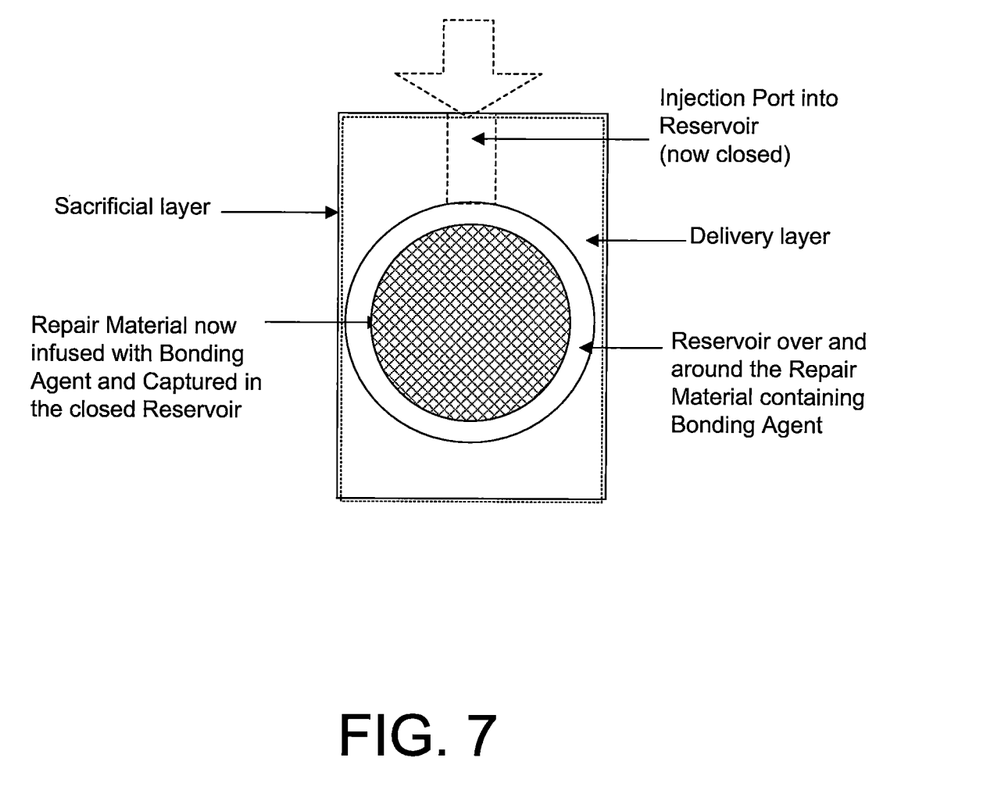

With reference to FIG. 7, the delivery layer, sacrificial layer, and repair material are formed into a sub-assembly generally referred to as the repair packet, the repair material may be infused with a bonding agent through the open access point or access port in the top of the repair packet, down into the reservoir around the repair material. After injecting or infusing, the top of the repair packet is sealed in order to contain any flow of the bonding agent. It may be desired to not infuse a bonding agent at this phase as a bonding agent could be introduced at a later stage in the repair process by injection or vacuum with a light curing or thermoset bonding agent after the repair packet is delivered to the surface of a subject's repair area.

The injected bonding agent is now infused or impregnated into the repair material and the repair material and bonding agent are captured in the reservoir created by the adhesive lamination and non adhesive perimeter around the repair material but within the reservoir on the delivery layer and the adhesive or non-adhesive on the sacrificial substrate up and to the perimeter around reservoir of the repair material creating the reservoir void over and around the repair material. The top of the repair and injection port can then be sealed to secure the bonding agent in its reservoir until the repair packet is ready to be open and used.

Thus, in a first step of manufacture, a delivery layer is created with lite adhesive or alternative bonding technique/method to the surface in the area as defined above. Next, the repair material is applied to the surface of the delivery layer wherein the repair material is dry without a bonding agent. The bonding agent on the delivery layer holds the repair material in place during the manufacturing process and during the delivery of the repair material to the surface of the subject to be repaired.

The opposing side of the delivery layer is the sacrificial layer and may have an adhesive on the face of the sacrificial substrate if necessary but not required, such that a perimeter created and/or maintained around the perimeter of the repair material when the sacrificial substrate and the delivery layer are adjoined. However, the sacrificial substrate should not have any adhesive in the area of the repair materials and in the area of the perimeter around the repair material but within the reservoir. The reason for this is that prior to the delivering the repair material and bonding agent the object surface, the sacrificial layer must be able to be separated from the delivery layer, repair materials and bonding agent while leaving the repair materials and/or bonding agent securely fashioned and undamaged on the face of the delivery layer prior to delivering these materials from the delivery layer to the object's surface.

Once the repair material is fastened to the surface of the delivery layer, the delivery layer and the sacrificial layer are assembled together securing the parameter in such a way that in opening remains between the surface of the delivery layer and sacrificial layer with either no repair material or the repair material contained therein and a void surrounding the repair material also remains such that a bonding agent can be input, infused, or fill the internal void of the repair packet prior to sealing it shut. The bonding agent automatically infuses or impregnates the repair material and is then captured and/or contained in place within the repair packet and the reservoir therein by way of the seal between the delivery layer and the sacrificial layer, around the perimeter of the delivery layer and sacrificial layer and repair materials. Alternatively, it should also be considered that the bonding agent can be applied to the surface of the repair materials in process and prior to applying and securing the sacrificial substrate to the delivery layer and then sealing a perimeter around the repair material and bonding agent such that they are both securely contained in the reservoir.

The delivery layer and the sacrificial substrate can be peeled apart from each other exposing the repair material and/or the bonding agent that will be delivered to the objects surface that needs repair or augmentation.

In some instances, the bonding may be contained separately so that the bonding agent may be applied to the materials after the repair material is secured to the subject's surface by way of the delivery layer. The bonding agent may then be introduced by way of injection or vacuum infusion.

After the repair material is deposited onto the subjects surface by way of the delivery layer, once the delivery layer is adhered and sealed around the repair materials and/or bonding agent skin tension of the delivery layer will create downward pressure on the repair materials and bonding agent which will yield a higher quality finish and a stronger mechanical and/or chemical bond. Furthermore, the waterproof, airtight seal created on top of and around the repair material and/or bonding agent by the delivery layer will also help to keep out dust, debris, water and other contaminants. The elimination of such contaminants will ultimately render better bonding, finishing quality and structural repair strength. If a water tight seal has been achieved between the delivery layer and the repair subject is non-structural, the subject being repaired may be able to be used, introduced into the water, or exposed to contaminants without being compromised and while curing takes place without contaminating the repair materials and bonding agent. Furthermore, the delivery layer helps to mitigate the amount of finish sanding, faring and feathering of the repair material and bonding agent into the non-damage area. FIG. 6 may be seen as one example of the execution of this.

The kit can have any of a variety of shapes and sizes, material weights or material composition and chemical composition of the bonding agent that can be selected, positioned or tailored relative to the nature of the damage, structural requirements, subject's construction and composition, to be repaired. The repair packet may be applied in its entirety, however, can be cut to size if necessary but this may compromise some of the benefits and sealing capabilities created by the delivery layer. The Outer Carton comes complete with the necessary materials to fix repair damage to the object. The materials provided in the kit allow for clean and easy way to apply the necessary and applicable repair materials. The repair materials are packaged in such a way to minimize the preparation of all the repair materials separately and individually, as this can be cumbersome, messy, and require substantial knowledge and expertise to prepare the appropriate amount of repair materials.

The repair materials and bonding agent are supplied with the proper ratios to achieve the maximum hardness and bonding strength. The material and chemical composition can be varied and combined in various combinations of materials, resin or otherwise to be appropriately compatible to any item or device that needs repairs. The disclosed kit makes the mixing, where applicable, of one or more materials easy and accurate to maximize its bonding and structural strength or finish quality and aesthetic appeal. The catalyst of such materials may be from a chemical, exothermic, endothermic, air, ultra-violet or other light source or other applicable catalyst to affect the curing of all materials and bonding agents. The chemistry of the bonding agent can vary to accommodate curing time or address other environmental factors such as heat, cold, humidity, exposure to open air or curing under water. The disclosed kit also mitigates the messy process that is inherent with preparing the surface, mixing and laminating materials. The packaging and applicators may also act as a mask to a given area in order to mitigate the seepage of materials beyond the desired area of repair. The packaging of the materials can be offered in a variety of shape and sizes to suit a repair of any size and configuration and surface. Part of the packaging or contained substrate will help to cover the repair until the curing processes is complete in order to mitigate or eliminate the need for post curing sanding and faring of the repair.

Figure 8:
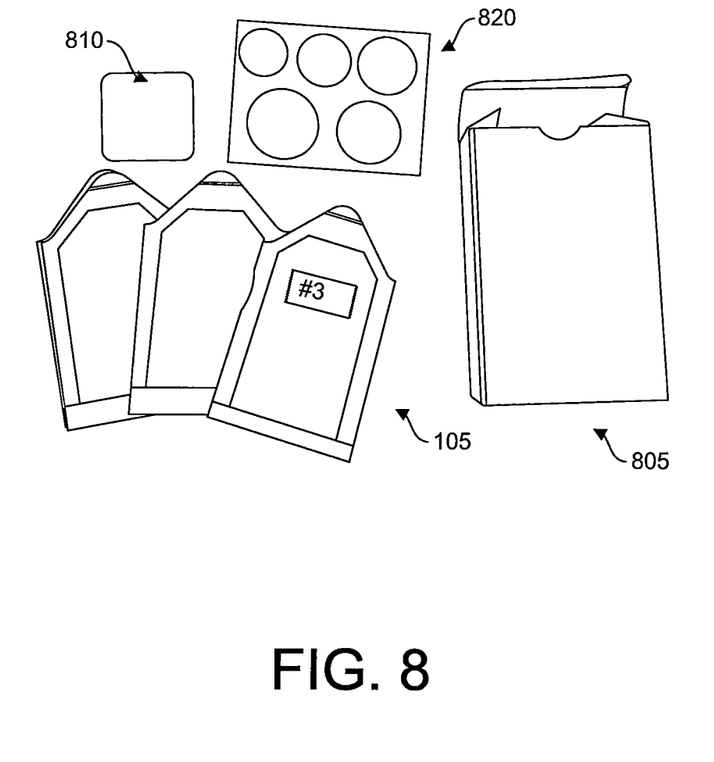
FIG. 8 shows example components of the repair kit.

In use, a person first identifies an item having a material to be repaired. The user then selects an appropriate repair kit having the proper shape, repair material, compatible bonding agent type, color, curing time, weight or strength or thickness of materials, with the foregoing corresponding to the item/material to be repaired. With reference to FIG. 8, the repair 105 kit may be contained in an outer carton 805, which may be a structure that is impermeable to light in order to maintain the integrity of the contained repair kit. This will eliminate or mitigate premature curing of the bonding agent. The parts of the repair kit including the external packaging that contains the repair packet are contained within the outer carton. The outer carton may also contain additional components including tools such as a device for sanding the material to be repaired. For example, the outer carton may contain a sanding block 810 and a sizing jig or template 820.

The overall outer and inner packaging as well as the tools in the repair materials and bonding agents are configured to minimize the amount of materials required an excess material waste.

Prior to using the repair kit on the material to be repaired, the surface of section material to be repaired can be prepped such as by sanding the material using the sanding block contain within the outer container. This cleans and forms a depression on the surface thereby allowing the repair material and bonding agent to cure close to flush with the top plane or surface of the object being repaired.

Any component of the repair including the outer carton can include an identifier, such as a number, that corresponds to a particular size of a repair packet that is needed to sufficiently cover the repair area with the repair packet. A sizing jig or template can be positioned over the damaged area to determine the size and shape of the necessary repair packet.

Next, the user selects the repair kit that corresponds to the size of the area to be repaired. As mentioned, the external packaging may have an identifier such as a number, color, shape or other identifier that indicates the size of the repair packet within the outer container. The user then peels apart the two sides of the external packaging to expose the contained repair packet. The repair packet is now ready to be applied to object to be repaired. The repair packet is advantageously configured to keep the repair material and bonding agent sandwiched within the packet and securely contained therein prior to use. Once the user is ready to apply the repair material and bonding agent to the object to be repaired, the user removes (such as by peeling) the sacrificial layer and maintains the delivery layer in an orientation in which they can be applied to the object to be repaired. The delivery layer is attached to both the repair material and bonding agent. As mentioned, a substrate frame can be included double the applicator substrate in shape and form.

The delivery layer has a size and shape such that the user can grasp it. It permits the user to handle or otherwise manipulate the repair materials and bonding agent without the need for wearing gloves. The delivery layer holds the repair material and bonding agent in a secure position as they are applied over the area to be repaired. The delivery layer has multidirectional stretch characteristics that allow it to not only be applied to a flat surface but to also be stretched into compounded curves with the repair material and bonding agent also following such curves. The skin tension of the delivery layer when stretched also aids in improving the bonding strength and feathers and flares the repair material and bonding agent into the surface of the object that it is to be applied.

Next, the user uses the applicator substrate to apply the repair material and bonding agent to the surface to be repaired. The waterproof substrate helps to keep external elements out of the area of the repair surface. The user presses the delivery layer or runs his or her finger around the top perimeter of the delivery layer around the outside perimeter of the repair material and bonding agent, which are visible through the delivery layer. This forms a seal around the repair materials and bonding agent mitigating or eliminating any chance that the bonding agent could flow outside the sealed perimeter. The user can also apply pressure to the delivery layer to smooth out any wrinkles and to push the repair material into voids in the repair surface and also massage out any air bubbles. Once the applicator substrate is securely attached to the repair area, the applicator frame, if present, can be removed from the delivery layer or the user can keep in place.

The repair material and bonding agent are then allowed to cure with the delivery layer still in place. Leaving the delivery layer on the object being repaired during the curing process maintains skin tension the repair material to aid bonding. This also eliminates or reduces the likelihood of the ability for water, dust, or other contaminants to come into contact with the repair material and bonding agent during the curing process. It also mitigates any air bubbles from escaping and osmosis from occurring, which could draw unwanted moisture air infiltration.

Next, after the bonding agent cures, the mechanical bond between the bonding agent, the repair materials, and the surface of the object being repaired is stronger than the adhesive on the delivery layer. This permits the user peel away the delivery layer without removing any repair material. Thus, the repair material remains intact on the object being repaired and is structurally sound and watertight. If the repair area on the subject needs to be expanded, built up, further reinforced, needs a different repair material or bonding agent, gelcoat or other layer place on top of the first layer or previous layers, then another repair packet can be opened and applied on top of the previous layer after the delivery layer is removed from the previous later. Finally, when the desired repair achieves its intended structural or aesthetic objective and after the delivery layer is removed leaving only the delivery layer cured repair material and bonding agent, the surface of the object can then be sanded to a desired finish.

The repair kit and method of news described above eliminates excessive material wastage that is typically found in traditional repair kits repair processes. It eliminates excess resins spillage, excess fiberglass for similar materials, as well as additional tools such as mixing cups, stirrers, plastic, tape, rubber gloves, etc.

As mentioned, the repair packet can also be in a long strip format that can be pulled from a canister dispenser. When pulled out of such a dispenser, any undispersed portion of the repair packet remains within a canister such that it is not exposed to external UV or alternative light is therefore preserved for future use.

In another embodiment, the repair kit is in the form of a thermoset repair packet. The repair packet can include a first portion that contains the bonding agent and a second portion that contains a hardener with a bar positioned between the two portions to keep them separated. A user can remove the bar to mix the contents of the first portion with the contents of the second portion. After they are mixed, they can be deployed from the repair packet by way of an applicator substrate with a two-part thermoset resin, which chemically cures without the need for a UV or other light source. The delivery system is otherwise the same as those which are described herein.

As mentioned, the repair materials and/or bonding agent are conveniently pre-applied, or easily applied prior to the delivery layer and the repair materials within the repair kit and specifically within the repair packet such that the user does not have to or select the proper amount and ratios of bonding agents and repair materials. The user removes the repair packet from the repair kit and applies the delivery layer with the repair materials to the damage area to be repaired in the same way or similar way as described in the other embodiments herein.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

The invention claimed is:

1. A kit for repairing material, comprising:
   (a) an external packaging defining a single, sealed, interior cavity;
   a repair packet inside the external packaging, (b) the repair packet comprising:
   a delivery layer;
   a repair material adhesively located on a first surface of the delivery layer, the repair material entirely contained within a reservoir on the delivery layer, wherein the repair material is pre-impregnated with a bonding agent such that the material is pre-impregnated with the bonding agent within the sealed, internal cavity of the external packaging, the bonding agent contained within the single, sealed, interior cavity with the repair material;
   an adhesive on the delivery layer, the adhesive configured to adhesively secure the delivery layer and the repair material to a surface to be repaired with the repair material entirely contained within the reservoir, wherein the adhesive defines a sealed perimeter border around the repair material such that the repair material is entirely contained on the delivery layer within the reservoir, which reservoir is defined by the adhesive on the delivery layer;
   a sacrificial layer juxtaposed with the repair material such that the repair material is sandwiched between the delivery layer and the sacrificial layer, wherein the repair material is positioned entirely between the delivery layer and the sacrificial layer;
   wherein the sacrificial layer can be peeled from the delivery layer and the delivery can be peeled away from the surface to be repaired without removing any repair material from the surface to be repaired;
   wherein the delivery layer forms a defined area of waterproof, air tight seal around the repair material and the bonding agent pre-impregnated into the repair material during curing of the repair material and the bonding agent to contain flow of the bonding agent outside of the defined area and wherein the delivery layer has skin tension that assists in bonding strength between the repair materials and a repair subject.

2. The kit of claim 1, wherein the repair material is at least one of fiberglass, carbon fiber, Kevlar aramid fiber, Innegra, a woven, co-woven, co-mingled, fibrous and non-fibrous material.

3. The kit of claim 1, wherein the external packaging is impermeable to light.

4. The kit of claim 1, wherein the sacrificial layer can be peeled from the repair material without causing the delivery layer to separate from the repair material, which is pre-impregnated with the bonding agent.

5. The kit of claim 1, wherein the kit includes an identifier, the identifier associated with at least a size and shape of the kit.

6. The kit of claim 5, wherein the identifier is further associated with a type of repair material and the bonding agent.

7. The kit of claim 1, wherein the delivery layer has a perimeter that includes adhesive.

8. The kit of claim 1, wherein any resin or bonding agent of the kit is contained only within the single, sealed, interior cavity with the repair material.

\* \* \* \* \*